(12) United States Patent
Wozniak

(10) Patent No.: US 11,809,929 B2
(45) Date of Patent: Nov. 7, 2023

(54) METHOD OF PRINTING ONTO VARIABLE-SIZED BOX SUBSTRATES

(71) Applicant: Memjet Technology Limited, Dublin (IE)

(72) Inventor: Terry Wozniak, San Diego, CA (US)

(73) Assignee: Memjet Technology Limited, Dublin (IE)

( * ) Notice: Subject to any disclaimer, the term of this patent is extended or adjusted under 35 U.S.C. 154(b) by 0 days.

(21) Appl. No.: 17/822,368

(22) Filed: Aug. 25, 2022

(65) Prior Publication Data

US 2023/0067802 A1 Mar. 2, 2023

Related U.S. Application Data

(60) Provisional application No. 63/237,920, filed on Aug. 27, 2021.

(51) Int. Cl.
*G06K 15/00* (2006.01)
*G06K 15/02* (2006.01)
(Continued)

(52) U.S. Cl.
CPC ....... *G06K 15/4065* (2013.01); *G06K 15/102* (2013.01); *G06K 15/1836* (2013.01);
(Continued)

(58) Field of Classification Search
CPC .... G06F 3/1247; G06F 3/1285; G06F 3/0488; G06F 3/1288; G06F 3/1226; G06F 3/14; G06F 3/167; G06F 3/126; G06F 3/0482; G06F 3/1205; G06F 3/1203; G06F 3/1229; G06F 3/1208; G06F 3/1238; G06F 3/122; G06F 3/1236; G06F 3/1253; G06F 3/1258; G06F 3/1286; G06F 3/0481; G06F 3/04842; G06F 3/1228; G06F 3/1245; G06F 3/128; G06F 3/1284; G06F 3/162; G06F 3/12; G06F 3/1204; G06F 3/1206; G06F 15/16; G06F 3/041; G06F 3/0412; G06F 3/048; G06F 3/1243; G06F 3/1215; G06F 3/1282; G06F 3/1213; G06F 3/1251; G06F 30/394; G06F 3/03545; G06F 3/046; G06F 3/033; G06F 16/5866; G06F 21/86;
(Continued)

(56) References Cited

U.S. PATENT DOCUMENTS 5,964,686 A * 10/1999 Bidlack .................... B26F 1/00
493/63
8,062,477 B2 * 11/2011 Appleford ................ D21J 3/00
162/134
(Continued)

*Primary Examiner* — Negussie Worku
(74) *Attorney, Agent, or Firm* — Cooley LLP

(57) ABSTRACT

A method of printing onto a planar box substrate used for assembling a box having predetermined box dimensions. The method includes the steps of: determining box dimensions based on the planar box substrate; retrieving generic instructions for image content to be printed on the box substrate; preparing box-specific transformations using the generic instructions and the box dimensions; applying the box-specific transformations on design components to generate image content portions commensurate with image content regions; generating image data based on the image content portions; and printing onto the box substrate using the image data.

13 Claims, 3 Drawing Sheets

(51) Int. Cl.
   *G06T 3/40* (2006.01)
   *G06T 11/00* (2006.01)
   *G06K 15/10* (2006.01)

(52) U.S. Cl.
   CPC ............ *G06T 3/40* (2013.01); *G06T 11/00* (2013.01); *G06T 2210/22* (2013.01)

(58) Field of Classification Search
   CPC .......... G06F 1/263; G06F 1/30; G06F 11/201; G06F 11/2015; G06F 11/2089; G06F 18/214; G06F 21/79; G06F 2221/2129; G06F 3/04847; G06F 17/00; G06F 17/40; G06F 18/24143; G06F 21/44; G06F 21/445; G06F 21/608; G06F 3/038; G06F 3/0416; G06F 3/121; G06F 30/00; G06F 1/16; G06F 1/187; G06F 1/20; G06F 11/1008; G06F 12/0246; G06F 13/4282; G06F 13/4291; G06F 16/83; G06F 18/253; G06F 21/46; G06F 21/57; G06F 21/64; G06F 2113/22; G06F 3/017; G06F 3/04142; G06F 3/0484; G06F 3/0604; G06F 3/1223; G06F 3/1237; G06F 3/1279; G06F 30/39; G06F 1/1607; G06F 1/1616; G06F 1/1624; G06F 1/1626; G06F 1/163; G06F 1/1632; G06F 1/1635; G06F 1/1641; G06F 1/1652; G06F 1/1679; G06F 1/1686; G06F 1/169; G06F 1/1698; G06F 1/182; G06F 1/3209; G06F 1/3215; G06F 1/3278; G06F 1/3287; G06F 13/28; G06F 13/4022; G06F 15/02; G06F 16/2282; G06F 16/288; G06F 16/381; G06F 16/489; G06F 16/909; G06F 18/251; G06F 21/10; G06F 21/72; G06F 21/73; G06F 21/76; G06F 21/80; G06F 2203/04806; G06F 2212/7203; G06F 2213/0026; G06F 2221/0797; G06F 2221/2103; G06F 3/002; G06F 3/03; G06F 3/0304; G06F 3/0346; G06F 3/0362; G06F 3/04162; G06F 3/04897; G06F 3/0605; G06F 3/0631; G06F 3/0635; G06F 3/0644; G06F 3/0655; G06F 3/0659; G06F 3/0661; G06F 3/0665; G06F 3/067; G06F 3/0679; G06F 3/0688; G06F 3/1211; G06F 3/1212; G06F 3/1214; G06F 3/123; G06F 3/1231; G06F 3/1234; G06F 3/1254; G06F 3/1255; G06F 3/1256; G06F 3/1267; G06F 3/1275; G06F 3/1291; G06F 3/1423; G06F 30/17; G06F 40/174; G06F 8/65; B41J 2/17553; B41J 2/1752; B41J 2/17546; B41J 2/17513; B41J 2/175; B41J 2/01; B41J 2/1753; B41J 2/17526; B41J 2/17566; B41J 2/17523; B41J 2/17503; B41J 3/4075; B41J 2/16585; B41J 29/393; B41J 11/0085; B41J 2/17509; B41J 29/38; B41J 15/044; B41J 25/304; B41J 13/0027; B41J 32/00; B41J 29/377; B41J 11/007; B41J 11/008; B41J 2/04581; B41J 3/407; B41J 2/04541; B41J 29/13; B41J 11/0015; B41J 2/04588; B41J 11/002; B41J 2/155; B41J 29/02; B41J 2/17596; B41J 2/32; B41J 2/325; B41J 2002/14491; B41J 2/1755; B41J 2/17559; B41J 11/00214; B41J 11/009; B41J 2/17506; B41J 2/215; B41J 2002/16555; B41J 11/00216; B41J 2/14233; B41J 2202/20; B41J 2/0458; B41J 2/14201; B41J 2/16552; B41J 2/17556; B41J 2/04596; B41J 2002/14362; B41J 2/04593; B41J 2/14; B41J 2/0057; B41J 2/0451; B41J 2/04543; B41J 2/16508; B41J 2/16517; B41J 2002/17573; B41J 25/308; B41J 3/60; B41J 2/04501; B41J 2/04586; B41J 2/2114; B41J 2002/17516; B41J 2002/17583; B41J 17/32; B41J 2/04563; B41J 2002/14419; B41J 2002/17569; B41J 25/34; B41J 3/546; B41J 13/08; B41J 2/14209; B41J 2/1623; B41J 2/16588; B41J 15/00; B41J 2/16538; B41J 2202/12; B41J 3/36; B41J 3/4073; B41J 3/445; B41J 13/0009; B41J 13/103; B41J 15/04; B41J 2/04573; B41J 2/07; B41J 2/145; B41J 2/15; B41J 2/1626; B41J 2/1632; B41J 2/21; B41J 2202/21; B41J 3/543; B41J 15/02; B41J 2/045; B41J 2/04528; B41J 2/1433; B41J 2/1642; B41J 2/165; B41J 2/17543; B41J 11/46; B41J 13/00; B41J 2/04548; B41J 2/14427; B41J 2/1637; B41J 2/1639; B41J 2/1643; B41J 2/1648; B41J 2/16535; B41J 2/18; B41J 2/2117; B41J 2002/14241; B41J 2202/11; B41J 25/3088; B41J 29/023; B41J 3/46; B41J 11/00222; B41J 11/0035; B41J 11/0095; B41J 2/005; B41J 2/06; B41J 2/1628; B41J 2/1629; B41J 2/1631; B41J 2/1646; B41J 2/17533; B41J 2/17536; B41J 2202/17; B41J 11/00; B41J 11/06; B41J 13/26; B41J 2/0455; B41J 2/04551; B41J 2/0459; B41J 2/1601; B41J 2/1635; B41J 2/1645; B41J 2/1714; B41J 2/1721; B41J 2/2107; B41J 2/2132; B41J 2/2135; B41J 2002/041; B41J 2002/14475; B41J 2002/17576; B41J 3/4078; B41J 35/36; B41J 11/001; B41J 11/04; B41J 2/04506; B41J 2/16541; B41J 2/16547; B41J 2/16579; B41J 2/17; B41J 2/17563; B41J 2/185; B41J 2/19; B41J 2/195; B41J 2/2142; B41J 2/3558; B41J 2002/14354; B41J 2002/17579; B41J 3/00; B41J 3/28; B41J 11/0065; B41J 11/485; B41J 11/703; B41J 13/0018; B41J 15/042; B41J 17/24; B41J 2/00; B41J 2/015; B41J 2/04556; B41J 2/0456; B41J 2/04571; B41J 2/125; B41J 2/14024; B41J 2/14048; B41J 2/14072; B41J 2/14274; B41J 2/16505; B41J 2/16526; B41J 2/16544; B41J 2/2146; B41J 2/355; B41J 2/3551; B41J 2/36; B41J 2/365; B41J 2002/1441; B41J 2002/17589; B41J 2202/10; B41J 2202/19; B41J 3/44; B41J 33/14; B41J 35/04; B41J 35/22; B41J 11/0025; B41J 11/003; B41J 11/42; B41J 11/70; B41J 15/048; B41J 17/22; B41J 2/04508; B41J 2/04521; B41J 2/04536; B41J 2/04553; B41J 2/04561; B41J 2/0457; B41J 2/04578; B41J 2/04591; B41J 2/135; B41J 2/14016; B41J 2/14032; B41J 2/1408; B41J 2/1609;

B41J 2/1754; B41J 2/2054; B41J 2/4753;
B41J 2002/14403; B41J 2002/16573;
B41J 2029/3935; B41J 3/39; B41J 31/00;
B41J 11/0022; B41J 11/0045; B41J
11/006; B41J 11/0075; B41J 11/58; B41J
11/66; B41J 13/0081; B41J 13/10; B41J
15/16; B41J 17/02; B41J 17/18; B41J
17/36; B41J 2/025; B41J 2/04505; B41J
2/04518; B41J 2/0452; B41J 2/04525;
B41J 2/04545; B41J 2/04546; B41J 2/02;
B41J 2/055; B41J 2/115; B41J 2/1404;
B41J 2/14129; B41J 2/14145; B41J
2/14314; B41J 2/16; B41J 2/1606; B41J
2/161; B41J 2/1621; B41J 2/1652; B41J
2/16523; B41J 2/2103; B41J 2/2139;
B41J 2/315; B41J 2/3555; B41J 2/505;
B41J 2002/14258; B41J 2002/14379;
B41J 2002/14435; B41J 2002/14459;
B41J 2002/1655; B41J 2002/16594; B41J
2002/1728; B41J 2002/17586; B41J
2029/3937; B41J 2202/03; B41J 2202/08;
B41J 25/006; B41J 29/12; B41J 3/4071;
B41J 3/40733; B41J 31/12; B41J
11/0005; B41J 11/00212; B41J 11/0024;
B41J 11/005; B41J 11/0055; B41J
11/663; B41J 13/02; B41J 13/025; B41J
13/24; B41J 15/046; B41J 15/08; B41J
19/147; B41J 2/03; B41J 2/04; B41J
2/04503; B41J 2/04515; B41J 2/04555;
B41J 2/04566; B41J 2/14064; B41J
2/1412; B41J 2/162; B41J 2/16532; B41J
2/1707; B41J 2/20; B41J 2/205; B41J
2/2128; B41J 2/235; B41J 2/345; B41J
2/41; B41J 2002/14306; B41J
2002/14467; B41J 2002/16502; B41J
2002/16558; B41J 2002/16561; B41J
2002/1657; B41J 2202/02; B41J 2202/07;
B41J 2202/18; B41J 2203/01; B41J
23/04; B41J 25/00; B41J 25/001; B41J
25/3082; B41J 27/00; B41J 27/10; B41J
29/00; B41J 29/026; B41J 29/17; B41J
29/26; B41J 29/48; B41J 3/26; B41J
3/382; B41J 3/40731; B41J 3/413; B41J
3/62; B41J 31/14; B41J 33/003; G06K
15/1836; G06K 15/02; G06K 15/181;
G06K 19/06037; G06K 7/1417; G06K
1/121; G06K 7/0008; G06K 19/07749;
G06K 17/0022; G06K 7/10336; G06K
19/06028; G06K 19/07758; G06K
19/076; G06K 7/10178; G06K 7/10346;
G06K 7/10366; G06K 7/10445; G06K
15/102; G06K 19/041; G06K 19/10;
G06K 7/14; G06K 1/08; G06K 19/04;
G06K 19/06056; G06K 19/14; G06K
5/00; G06K 7/10732; G06K 7/1443;
G06K 7/1452; G06K 7/1456; G06K
7/1473; G06K 15/024; G06K 15/028;
G06K 19/073; G06K 7/10099; G06K
7/1413; G06K 15/027; G06K 17/0032;
G06K 19/06; G06K 7/10316; G06K
7/1404; G06K 15/022; G06K 15/16;
G06K 15/1807; G06K 15/1857; G06K
15/1868; G06K 15/4065; G06K 15/407;
G06K 17/00; G06K 19/06046; G06K
19/07; G06K 19/0717; G06K 19/077;
G06K 2215/0097; G06K 15/1809; G06K
15/1848; G06K 15/1878; G06K 15/402;
G06K 17/0025; G06K 19/06187; G06K
19/0701; G06K 19/0723; G06K
19/07722; G06K 19/07726; G06K
19/0775; G06K 19/07779; G06K
19/07783; G06K 19/07794; G06K
19/07798; G06K 7/10297; H04N
2201/0094; H04N 1/4413; H04N
2201/0039; H04N 1/00244; H04N
1/00283; H04N 1/00307; H04N 1/00403;
H04N 1/00411; H04N 1/00488; H04N
1/00854; H04N 1/00938; H04N 1/32534;
H04N 1/32582; H04N 1/442; H04N
2201/0041; H04N 2201/0053; H04N
2201/0055; H04N 2201/0082; H04N
7/16; H04N 23/00; H04N 5/2628; H04N
1/00519; H04N 1/622; H04N 1/3873;
H04N 5/272; H04N 5/64; H04N 9/75;
H04N 1/00525; H04N 1/00538; H04N
1/00541; H04N 1/024; H04N 1/02427;
H04N 1/02463; H04N 1/031; H04N
1/193; H04N 2201/0434; H04N 9/3141;
H04N 9/3179; H04N 9/3194; H04N
1/00087; H04N 1/0461; H04N 1/6033;
H04N 1/00; H04N 1/00045; H04N 1/12;
H04N 1/387; H04N 1/40031; H04N
1/40075; H04N 1/4057; H04N 1/4433;
H04N 1/46; H04N 1/52; H04N 1/54;
H04N 1/6027; H04N 1/6044; H04N
1/6083; H04N 23/55; H04N 5/642; H04N
1/00023; H04N 1/00204; H04N 1/00278;
H04N 1/0048; H04N 1/00599; H04N
1/00602; H04N 1/00649; H04N 1/00798;
H04N 1/00896; H04N 1/00904; H04N
1/0318; H04N 1/0464; H04N 1/1135;
H04N 1/1215; H04N 1/129; H04N
1/2032; H04N 1/2307; H04N 1/233;
H04N 1/32363; H04N 1/32443; H04N
1/40; H04N 1/60; H04N 1/6019; H04N
1/6072; H04N 1/6097; H04N 17/002;
H04N 2201/0013; H04N 2201/0017;
H04N 2201/0081; H04N 2201/04706;
H04N 2201/04755; H04N 2201/3294;
H04N 23/15; H04N 23/51; H04N 23/57;
H04N 23/673; H04N 25/411; H04N
5/142; H04N 5/655; H04N 7/0117; H04N
7/0125; H04N 7/18; H04N 7/20; B41F
21/00; B41F 19/007; B41F 5/24; B41F
19/008; B41F 19/001; B41F 11/02; B41F
33/0036; B41F 23/0466; B41F 15/14;
B41F 5/00; B41F 13/004; B41F 5/02;
B41F 33/02; B41F 23/08; B41F 31/02;
B41F 13/0024; B41F 21/08; B41F 33/00;
B41F 13/10; B41F 15/08; B41F 15/40;
B41F 17/00; B41F 23/045; B41F
33/0009; B41F 33/0081; B41F 33/16;
B41F 15/18; B41F 22/00; B41F 23/00;
B41F 23/04; B41F 5/04; B41F 13/54;
B41F 15/0881; B41F 15/34; B41F 15/36;
B41F 15/44; B41F 17/003; B41F 19/00;
B41F 23/0453; B41F 5/18; B41F 13/11;
B41F 15/12; B41F 19/004; B41F 19/005;
B41F 21/10; B41F 23/044; B41F
23/0456; B41F 23/0479; B41F 23/0483;

B41F 35/00; B41F 7/025; B41F 9/021; B41F 13/70; B41F 16/008; B41F 16/02; B41F 17/38; B41F 21/12; B41F 21/14; B41F 23/002; B41F 31/022; B41F 33/06; B41F 13/0045; B41F 13/02; B41F 13/46; B41F 15/0818; B41F 15/42; B41F 19/062; B41F 23/0423; B41F 27/12; B41F 33/0045; B41F 13/012; B41F 13/14; B41F 13/56; B41F 15/423; B41F 17/002; B41F 17/10; B41F 21/06; B41F 23/0443; B41F 27/1206; B41F 31/03; B41F 31/04; B41F 31/08; B41F 31/18; B41F 33/0027; B41F 35/005; B41F 13/0008; B41F 13/008; B41F 13/016; B41F 13/22; B41F 13/30; B41F 13/44; B41F 13/60; B41F 15/16; B41F 15/26; B41F 16/00; B41F 16/0046; B41F 16/006; B41F 17/008; B41F 17/18; B41F 17/20; B41F 17/26; B41F 19/002; B41F 19/02; B41F 19/06; B41F 23/0426; B41F 23/06; B41F 25/00; B41F 31/00; B41F 31/002; B41F 31/05; B41F 31/06; B41F 31/13; B41F 31/20; B41F 7/12; B41F 9/025; B41F 9/066; B41F 9/068; B41F 9/1036; B41F 9/1063; B41F 9/1072; B41N 1/248; B41N 1/24

USPC .......................................................... 358/1.2

See application file for complete search history.

(56) References Cited

U.S. PATENT DOCUMENTS

| 10,382,645 | B2* | 8/2019 | Bai | ..................... H04N 1/32309 |
| 2012/0257072 | A1* | 10/2012 | Jirman | ..................... G06T 11/00 |
| | | | | 348/222.1 |
| 2014/0118395 | A1* | 5/2014 | Jirman | ..................... G06T 11/00 |
| | | | | 345/660 |

* cited by examiner

METHOD OF PRINTING ONTO VARIABLE-SIZED BOX SUBSTRATES

CROSS REFERENCE TO RELATED APPLICATIONS

This application claims priority to and the benefit of U.S. Provisional Patent Application No. 63/237,920, filed on Aug. 27, 2021, the disclosure of which is incorporated herein by reference in its entirety for all purposes.

FIELD OF THE INVENTION

The present invention relates to a method of printing onto substrates used to form boxes having variable sizes. It has been developed primarily to reduce image processing requirements for digitally printing onto box substrates, as well as providing a versatile process amenable to box substrates having different dimensions.

BACKGROUND

Inkjet printers employing Memjet® technology are commercially available for a number of different printing formats, including desktop printers, digital inkjet presses and wideformat printers. Memjet® printers typically comprise one or more stationary inkjet printhead cartridges, which are user-replaceable. For example, a desktop label printer comprises a single user-replaceable full color printhead cartridge; a high-speed inkjet press comprises a plurality of user-replaceable monochrome printhead cartridges aligned along a media feed direction; and a wideformat printer comprises a plurality of user-replaceable full color printhead cartridges in a staggered overlapping arrangement so as to span across a wideformat pagewidth.

Increases in print speed and print quality through new printing technologies enables broader applications of pagewide inkjet technology. For example, U.S. Pat. No. 10,144,232, the contents of which are incorporated herein by reference, describes a scalable, modular pagewide printing system in which multiple print modules can be arranged in an N×M two-dimensional array. Providing OEM customers with the flexibility to select the dimensions and number of printheads in an N×M array and in a modular, cost-effective kit form enables access to a wider range of commercial digital printing markets that are traditionally served by offset or other printing systems.

U.S. Pat. No. 10,717,282, the contents of which are incorporated herein by reference, describes a four color printhead having redundancy in each color channel to provide excellent print quality in a robust and versatile pagewide printhead.

The corrugated packaging market is a rapidly growing sector for digital inkjet printing technology. Increasingly, consumers wish to receive products in boxes appropriately sized for their products, rather than receive products in standard-sized boxes with copious amounts of packing material. Customized packaging ("fit-to-demand" or "box-on-demand" systems) requires customized printing systems that can be readily configured for printing onto variable-sized corrugated box substrates, which are subsequently folded into boxes. Ideally, customized packaging should also include image content on the box, which is tailored to, for example, the packaged products or customers' personalized preferences.

Conventional offset printing technology is not well suited for handling the demands of customized packaging. Individual printing plates must be prepared for different-sized boxes or personalized image content, meaning that short print runs are commercially unviable. On the other hand, digital inkjet printing technology is well-suited to meet the demands of customized packaging, especially pagewide ("single-pass") inkjet printheads which are able to handle variable-sized substrates and variable image content at high speeds.

Nevertheless, whilst pagewide inkjet printing technology is potentially well-suited for customized packaging, challenges remain in generating image content for variable-sized boxes as well as optimizing print quality. A foldable box substrate typically contains twelve box panels and, in a conventional approach, each box panel is treated as a separate printing region with dedicated image content being generated for each box panel. However, this approach has very high image processing requirements, which ultimately creates a bottleneck in the overall printing process, since changing box dimensions effectively requires the generation of new image content for each box panel.

It would therefore be desirable to improve the efficiency of printing onto variable-sized box substrates using digital ink printing technology.

SUMMARY OF THE INVENTION

According to one aspect, there is provided a method of printing onto a planar box substrate used for assembling a box having predetermined box dimensions, the method comprising the steps of:

determining box dimensions of the box substrate, said box substrate having fold lines defining a plurality of box panels;

retrieving generic instructions for image content to be printed on the box substrate, said generic instructions defining: (a) one or more image content regions; (b) one or more design components for each image content region, each design component being independent of said box dimensions; and (c) a set of transformation rules associated with each design component, said transformation rules being dependent on at least one of: the image content regions and the box dimensions;

preparing box-specific transformations using the generic instructions and the box dimensions;

applying the box-specific transformations on the design components to generate image content portions commensurate with the image content regions, at least one of said transformations being selected from the group consisting of: positioning, rotating, scaling and cropping;

generating image data based on the image content portions; and printing onto the box substrate using the image data.

The method of printing onto box substrates, as described herein, advantageously provides efficient image processing with minimal human intervention in the graphic design of image content for variable sized boxes.

Preferably, at least one of the image content regions extends over a plurality of contiguous box panels.

In another aspect, there is provided a printing system configured for performing the method described herein.

In another aspect, there is provided a non-transitory computer readable medium storing a program causing a processor to execute image manipulation and/or image processing steps, as described herein.

BRIEF DESCRIPTION OF THE DRAWINGS

One or more embodiments of the present invention will now be described with reference to the drawings, in which.

DETAILED DESCRIPTION

Figure 1:
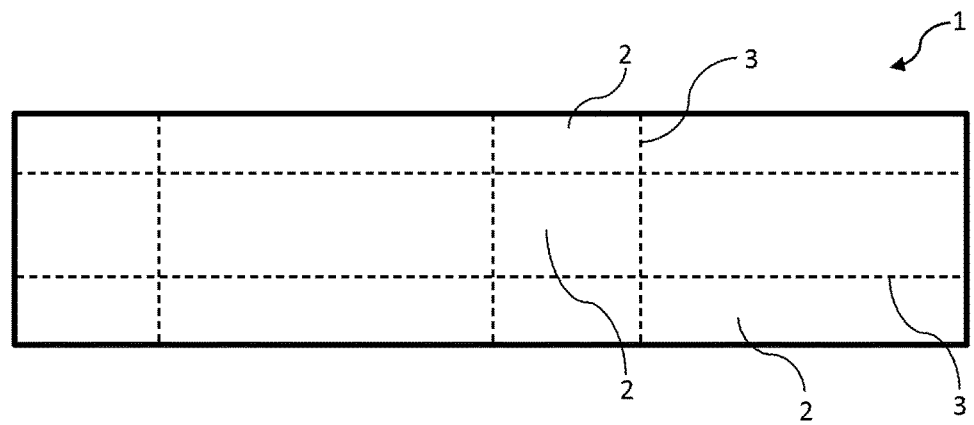
FIG. 1 shows in plan view a box substrate used for assembling a box.

Referring to FIG. 1, there is shown a planar box substrate 1, which can be assembled into a standard parcel box (not shown) used for mailing products. The box substrate 1 is divided into twelve box panels 2 by fivefold lines 3 (two longitudinal fold lines and three transverse fold lines). Although one box substrate 1 is shown in FIG. 1, it will be appreciated that parcel boxes may be provided in any size and/or any aspect ratio and, therefore, corresponding box substrates may be varied accordingly. Typically, parcel boxes include printed content, which may, for example, identify the product merchant, decorate the box or include personalized content. Accordingly, box substrates 1 usually receive print content before the boxes are assembled and products packaged for shipment.

Figure 5:
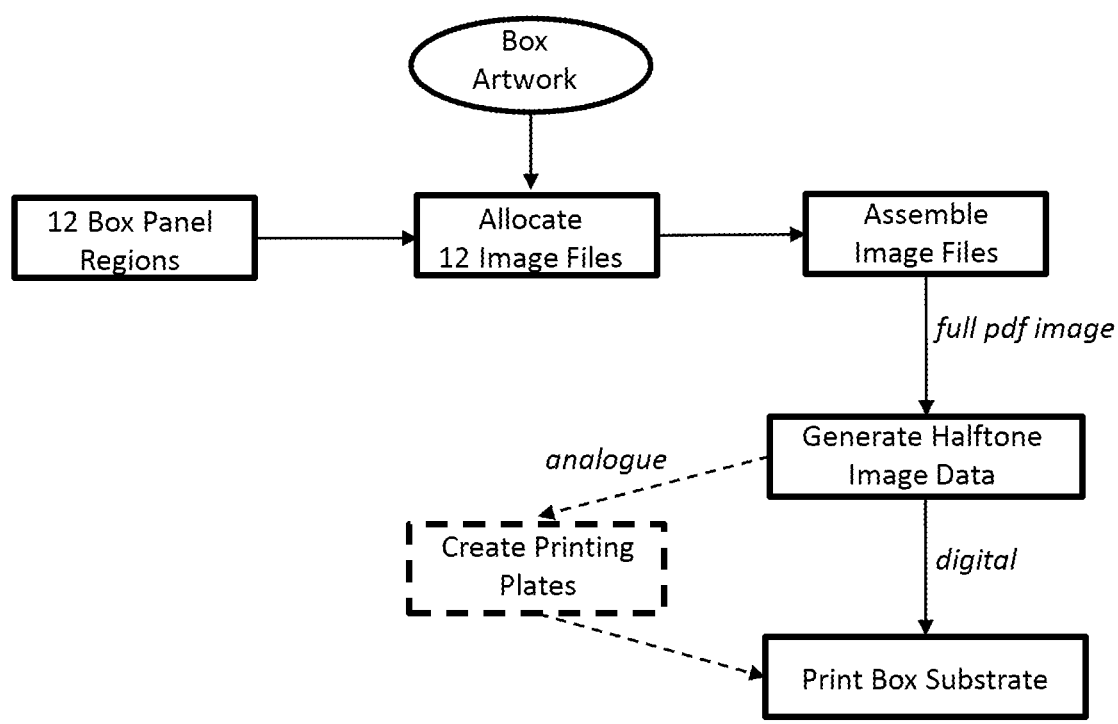
FIG. 5 shows a prior art process flow for printing onto box substrates.

Logically, the box substrate 1 is divided into twelve box panels 2 and, in a conventional printing process, image content for each box panel region is generated separately. As shown in FIG. 5, once box artwork has been designed by a graphic artist, twelve corresponding image files are generated and allocated to each of the twelve box panel regions. (Of course, some box panels may be left blank). The image files are then assembled into a pdf image, which is used to generate halftone image data in a raster image processor (RIP). The halftone image data in then used to create corresponding printing plates (e.g., offset printing plates or flexographic printing plates) for analogue printing, as is well known in the art. In the case of a digital inkjet press, the halftone images are sent directly to an inkjet printing system, which typically comprises one or more high-speed monochrome printheads.

The process described above in connection with FIG. 5 works well for long printing runs in which the same printing plates are used for printing onto same-sized box substrates. If a printing plate needs to be changed for a different sized box substrate (which necessitates different box artwork), then new box artwork is prepared, and a new printing plate is created using the same process. Effectively, the slowest step in the process is the preparation of the new printing plate and, therefore, image files for each box panel can be perfected offline so that printed images are tailored for respective boxes.

As foreshadowed above, digital printing technologies provide opportunities for printing onto variable-sized box substrates, because digital printing does not require time-consuming and expensive preparation of a dedicated printing plate for each box substrate. However, a digital printing process that effectively mimics the process described above for generating image content for variable-sized boxes has a number of shortcomings. In order for variable-sized box printing to be commercially viable, the process must operate at speeds that are competitive with conventional analogue box printing. In the above-described process, generation of twelve dedicated image files for each box panel every time the box dimensions are changed is not feasible—the process is time-consuming and requires intensive image processing. More significantly, generating new box artwork each the time box dimensions change is too slow and burdensome for relatively short print runs. Thus, the conventional process described in FIG. 5 is effectively unworkable for printing onto variable-sized box substrates.

Figure 2:
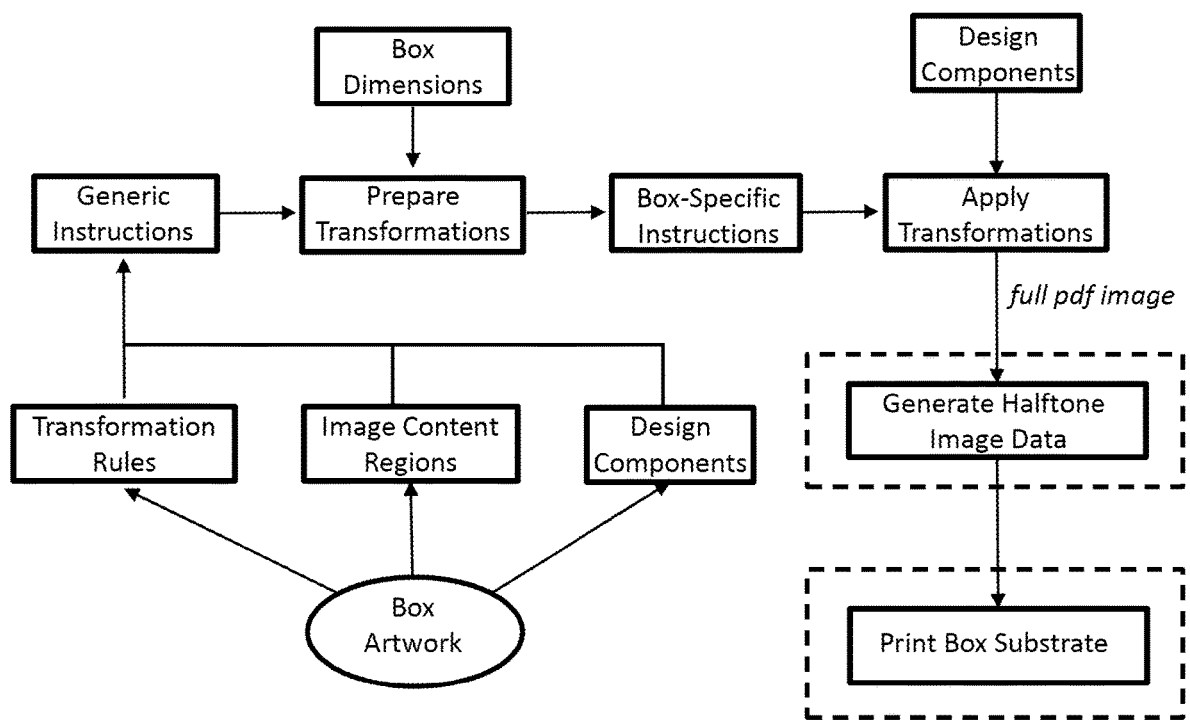
FIG. 2 shows a process flow printing onto box substrates.
Figure 3:
FIG. 3 shows various design components.
Figure 4:
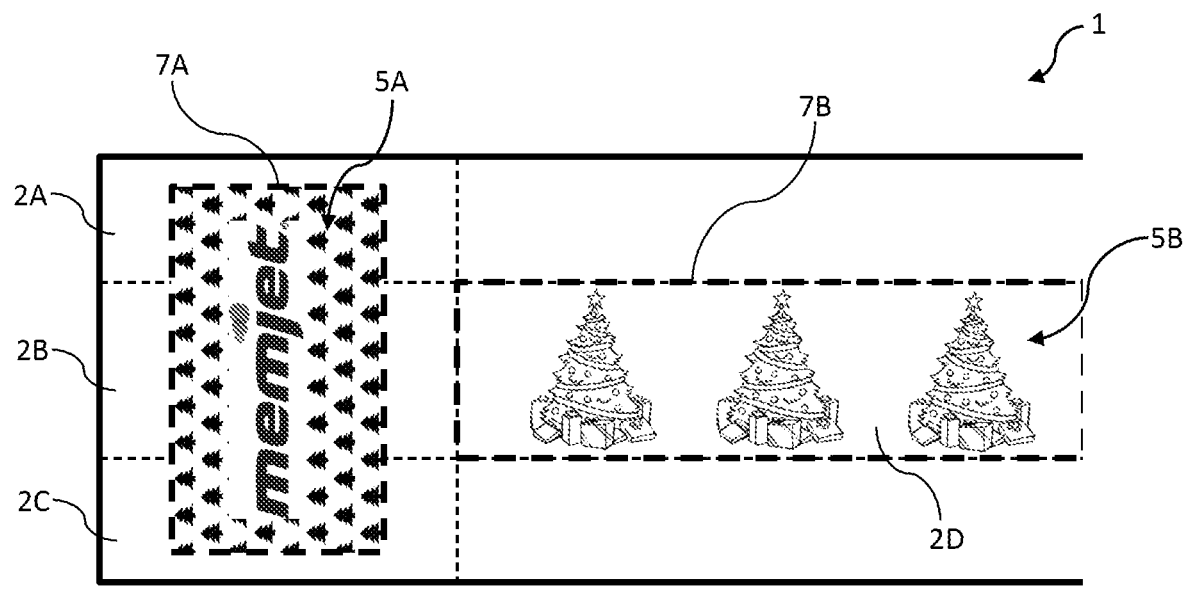
FIG. 4 shows part of a box substrate containing image content portions in two image content regions.

Referring to FIGS. 2 to 4, there is shown a process flow and a sample use case for preparing image data and printing onto variable-sized box substrates using a digital inkjet press. (Examples of suitable digital inkjet presses are described in U.S. Pat. Nos. 10,076,917 and 10,940,702, the contents of which are incorporated herein by reference).

As shown in FIG. 4, original box artwork with image content portions 5A and 5B is created (for, example, by a graphic artist) for a reference box substrate 1 having known dimensions. Once created, one or more image contents regions 7A and 7B corresponding to the image content portions 5A and 5B are identified. The image content regions 7A and 7B (indicated by dashed outlines) are not necessarily coincident with box panels. For example, the first image content region 7A shown in FIG. 4 extends over three contiguous box panels 2A-C, while the second image content region 7B essentially coincides with only one of the box panels 2D.

The extent of each image content region 7 is defined relative to the dimensions and/or aspect ratios of the box substrate 1 box panel(s) 2 aligned with the image content region. For example, the first image content region 7A may be defined in terms of a percentage area coverage relative to the three box panels 2A-C over which the first image content region extends, and margins of the first image content region may be defined relative to the size of the three box panels. The second image content region 7B may simply be defined as coincident and coextensive with the box panel 2D.

Having defined the image content regions, the box artwork within each image content region is then decomposed into one or more design components 8 (FIG. 3), each having an associated set of transformation rules for manipulating a respective design component. For example, the first image content region 7A contains the design components: (i) Christmas tree wallpaper and (ii) a Memjet® logo. The Christmas tree wallpaper component may be associated with transformation rules, such as: "scale proportionally to cover first image content region"; "crop to fit first image content region"; "rotate anticlockwise 90 degrees". The Memjet® logo component may be associated with transformation rules, such as "rotate anticlockwise 90 degrees"; "center within first image content region"; "scale proportionally to 80% of length dimension first image content region"; "overlay on Christmas tree wallpaper"; "do not crop" etc. In this way, and referring now to FIG. 2, the box artwork may be defined using a set of generic instructions that are independent of specific box dimensions. The generic instructions comprise: the image content regions, design components and associated transformation rules.

It will be appreciated that other types of box artwork may be defined in a similar manner using, for example, background images, logos, text, tiles, proportional images etc. The set of transformation rules associated with each design component will typically vary depending on the type of design component—some design components (e.g. background images) may be cropped as necessary; some design components (e.g. logos, images containing faces etc) may not be cropped; some design components must be scaled proportionally; some design components (e.g. plain backgrounds) may be scaled disproportionately; some design components may be tiled to fill an image content region; some design components may be centered or justified left/right etc.

With generic instructions for a reference box substrate defined, the same generic instructions may then be used to generate image data for a box substrate of any given size. As shown in FIG. 2, the generic instructions are used in combination with the box dimensions of a given box substrate to prepare transformations of the design components. The transformations prepared using the generic instructions are then converted into a set of box-specific instructions that are applied to the design components in order to prepare image content for the box substrate in a suitable page description language (e.g. pdf image). The pdf image is then sent to a raster image processor (RIP) in the usual manner to generate halftone image data, which is then sent to a digital inkjet printing system used for printing onto the box substrate. Using the same process flow, corresponding image data for different-sized box substrates may be prepared with high throughput, excellent image quality and acceptable design aesthetics for the finished boxed article.

From the foregoing, it will be appreciated that the process flow described above in connection with FIG. 2 is highly versatile and facilitates printing onto variable-sized box substrates. Advantageously, image data is generated by transforming design components according to a set of generic instructions that are independent of box dimensions, thereby obviating any redesign of artwork according to a particular box size. Furthermore, image content regions are flexibly defined according to regions of actual image content, rather than box panels. This assists in improving print quality, reducing image processing requirements and facilitating the versatile process flow described herein.

The foregoing describes only some embodiments of the present invention, and modifications of detail may be made thereto without departing from the scope of the invention, the embodiments being illustrative and not restrictive.

The invention claimed is:

1. A method of printing onto a planar box substrate used for assembling a box having predetermined box dimensions, said method comprising the steps of:
   determining box dimensions based on the planar box substrate, said box substrate having fold lines defining a plurality of box panels;
   retrieving generic instructions for image content to be printed on the box substrate, said generic instructions defining: (a) one or more image content regions for the box panels;
   (b) one or more design components for each image content region, each design component being independent of said box dimensions; and (c) a set of transformation rules associated with each design component, said transformation rules being dependent on at least one of: the image content regions and the box dimensions;
   preparing box-specific transformations using the generic instructions and the box dimensions;
   applying the box-specific transformations on the design components to generate image content portions commensurate with the image content regions, at least one of said transformations being selected from the group consisting of: positioning, rotating, scaling and cropping;
   generating image data based on the image content portions; and
   printing onto the box substrate using the image data.

2. The method of claim 1, wherein at least one of said image content regions extends over a plurality of contiguous box panels.

3. The method of claim 1, wherein the box dimensions are variable, and wherein an extent of each image content region is dependent on said box dimensions.

4. The method of claim 1, wherein the design components are selected from the group consisting of: proportional images, background images, tiles, text, barcodes and logos.

5. The method of claim 1, wherein the design components comprise a proportional image and the transformation includes cropping and/or proportionally scaling the image.

6. The method of claim 1 comprising the steps of:
   identifying a plurality of design components for each image content region; and
   independently applying one or more transformations on each of said plurality of design components.

7. The method of claim 6, wherein the plurality of design components are layered within a respective image content region.

8. The method of claim 1, wherein the step of generating image data is performed in a raster image processor (RIP).

9. The method of claim 8, wherein the step of applying transformations to provide image content portions is performed in a processor upstream of the RIP.

10. The method of claim 1, wherein the image content portions are generated in a page description language and the image data is generated as one or more halftone bitmaps.

11. The method of claim 1, further comprising the step of folding the printed box substrate along the fold lines to form the box.

12. The method of claim 1, wherein the step of printing onto the box substrate is performed using a single-pass inkjet printhead.

13. The method of claim 1, wherein the generic instructions are generated by decomposing original box artwork for a reference box substrate.

* * * * *